United States Patent
Kiyamura

(10) Patent No.: US 8,169,171 B2
(45) Date of Patent: May 1, 2012

(54) DRIVE APPARATUS

(75) Inventor: Kousuke Kiyamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 12/578,736

(22) Filed: Oct. 14, 2009

(65) Prior Publication Data

US 2010/0097021 A1    Apr. 22, 2010

(30) Foreign Application Priority Data

Oct. 20, 2008 (JP) .................................. 2008-270364

(51) Int. Cl.
*H02P 23/12* (2006.01)
(52) U.S. Cl. ................... 318/400.14; 318/696; 318/685; 396/133; 271/264; 399/167
(58) Field of Classification Search .................. 318/696, 318/685, 400.14; 396/133; 271/264; 399/167
See application file for complete search history.

(56) References Cited

U.S. PATENT DOCUMENTS

| | | | |
|---|---|---|---|
| 6,850,027 B2 * | 2/2005 | Kuwano et al. | 318/685 |
| 2003/0173929 A1 * | 9/2003 | Takemori et al. | 318/685 |
| 2004/0130089 A1 * | 7/2004 | Suzuki et al. | 271/9.01 |

FOREIGN PATENT DOCUMENTS

| | | | |
|---|---|---|---|
| JP | 09-331666 | | 12/1997 |
| JP | 10-150798 | | 6/1998 |
| JP | 10150798 A | * | 6/1998 |
| JP | 2002159196 A | * | 5/2002 |

* cited by examiner

*Primary Examiner* — Walter Benson
*Assistant Examiner* — Jorge Carrasquillo
(74) *Attorney, Agent, or Firm* — Cowan, Liebowitz & Latman, P.C.

(57) ABSTRACT

A drive apparatus includes a magnet rotor, a stator having a coil, a position detector configured to detect a position of the magnet rotor, a lead angle circuit configured to output a signal having a lead angle relative to an output of the position detector, a first driver configured to switch an electrification state of the coil in accordance with a preset time interval, a second driver configured to switch an electrification state of the coil in accordance with an output of the lead angle circuit, and a controller configured to adjust a lead angle amount of the signal output from the lead angle circuit within a range that does not cause step out in the driving by the first driver, prior to changing the driving by the second driver to the driving by the first driver.

5 Claims, 12 Drawing Sheets

DRIVE APPARATUS

BACKGROUND OF THE INVENTION

1. Field of the Invention

The present invention relates to a drive apparatus.

2. Description of the Related Art

A stepping motor easily provides a high resolution without a position detector and thus is generally position-controlled in accordance with an open-loop control. However, when it is driven at a high speed, it may cause step out. Therefore, Japanese Patent Laid-Open No. ("JP") 10-150798 proposes a motor control apparatus that provides a detector configured to detect a rotational position of a rotor and switches between an open-loop control that can provide precise positioning and a feedback control that can provide high-velocity driving.

The electrification is switched through an excitation to the coil, and the excitation current rises with a delay caused by the influence of the coil's inductance. Thus, as the rotor rotates faster, a phase switches and the torque lowers before the excitation current reaches a predetermined value. Accordingly, JP 10-150798 proposes to change, as the rotor's rotational velocity increases, a lead angle in accordance with the rotational velocity of the rotor, and to put forward an angle used to switch the excitation to the coil for early electrification to the coil. JP 09-331666 discloses one illustrative stepping motor.

Nevertheless, the motor control apparatus disclosed in JP 10-150798 can cause step out in switching the feedback control to the open-loop control. This is because a phase difference (or lead angle) between the electrification switching and the rotor position in the feedback control does not accord with that in the open-loop control.

SUMMARY OF THE INVENTION

The present invention provides a drive apparatus configured to prevent or reduce step out in switching a feedback control to an open-loop control.

A drive apparatus according to one aspect of the present invention includes a magnet rotor having a plurality of magnetic poles that are magnetized, a stator including a magnetic pole portion that opposes each pole of the magnet rotor, and a coil configured to excite the magnetic pole portion, a position detector configured to detect a position of the magnet rotor, a lead angle circuit configured to output a signal having a lead angle relative to an output of the position detector, a first driver configured to switch an electrification state of the coil in accordance with a preset time interval, a second driver configured to switch the electrification state of the coil in accordance with an output of the lead angle circuit; and a controller configured to change driving by the second driver to driving by the first driver, wherein prior to changing the driving by the second driver to the driving by the first driver, the controller adjusts a lead angle amount of the signal output from the lead angle circuit within a range that does not cause step out in the driving by the first driver.

Further features of the present invention will become apparent from the following description of exemplary embodiments with reference to the attached drawings.

DESCRIPTION OF THE EMBODIMENTS

Figure 1:
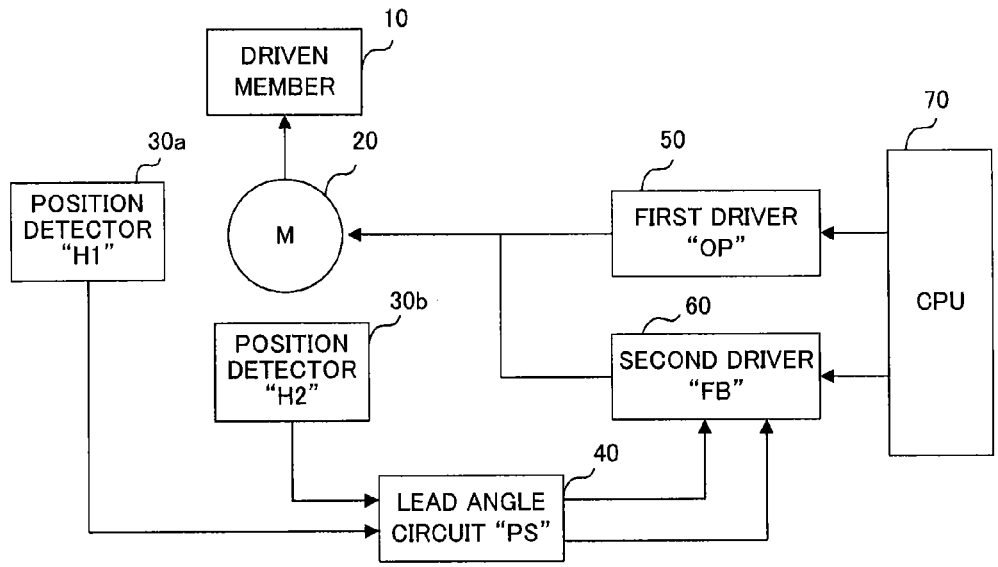
FIG. 1 is a block diagram of an electronic block diagram of this embodiment.

FIG. 1 is a block diagram of an electronic apparatus 100. The electronic apparatus 100 covers an optical unit, such as a digital camera or a video camera, an optical disk drive, or a printer. The electronic apparatus 100 includes a control object (driven member) 10 and a drive apparatus configured to drive and position the control object 10. For example, when the electronic apparatus 100 is a digital camera, the control object 10 is a focus lens of an optical system and the drive apparatus serves as a focus control unit. The drive apparatus includes a motor 20 configured to drive the control object 10, position detectors 30a and 30b, and a motor driver.

Figure 2:
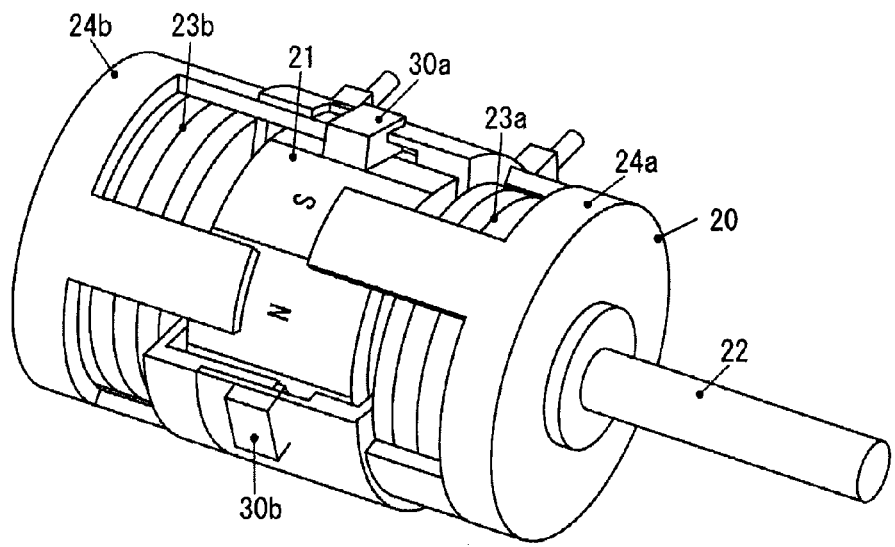
FIG. 2 is a perspective view of a motor and position detectors shown in FIG. 1.

FIG. 2 is a perspective view of the position detectors 30a and 30b. For description purposes, part of components is severed and shown. The motor 20 is a stepping motor that has an encoder so as to serve as a brushless DC motor in which the electrification is changed according to a position of the rotor. The stepping motor causes step out in which a rotation of the motor is not synchronized with a control pulse in the high-speed rotation and in the overload. Since the detector detects the position of the rotor, the brushless DC motor can maintain a synchronization between a command signal and a position of the rotor and prevents the step out.

The motor 20 (labeled by "M" in FIG. 1) includes a rotor 22 having a magnet 21, and a stator having a coil that provides a rotational force to the magnet 21. The motor 20 can apply a structure disclosed in JP 09-331666.

The magnet 21 is a cylindrical permanent magnet having an outer circumference magnetized with multiple poles. The magnet 21 has a magnetized pattern in which the magnetic force in a radial direction changes in a sinusoidal shape with respect to an angular position. The rotor 22 is supported rotatably by the stator, and integrally fixed with the magnet 21.

The stator includes a pair of coils 23a and 23b, a pair of yokes 24a and 24b, and a pair of position detectors 30a and 30b (labeled as "H1" and "H2" in FIG. 1). The yoke 24a has a plurality of pole teeth excited by the coil 23a. The yoke 24b has a plurality of pole teeth excited by the coil 23b. A torque given to the rotor 22 can be varied by changing an excited pole. A pair of position detectors 30a and 30b are Hall elements each configured to detect the magnetic flux of the magnet 21, and to output signals having phases that shift by an electric angle of 90°. Where "n" is the number of poles of the magnet 21, the electric angle of 360° corresponds to an angle of 720/n° of the actual rotor.

A method of detecting the rotational position of the rotor 22 is not limited. A detection magnet that displaces along with a rotation of the rotor 22 may be arranged and detected, or an optical detector may read a light shielding plate or a patterned surface. In addition, the position detectors 30a and 30b may be integrated with and fixed onto the motor 20, or fixed onto a member separate from the motor 20.

The motor driver includes a lead angle circuit 40, a first driver 50, a second driver 60, and a controller 70. The lead angle circuit (lead angle generator) 40 (labeled as "PS" in FIG. 1) operates detection results of the position detectors 30a and 30b, generates and outputs a lead angle signal having a lead angle corresponding to a lead angle setting signal supplied from the controller 70 (labeled as "CPU" in FIG. 1). The first driver 50 drives the motor 20 by the open electrification switching (OP driving) in accordance with a drive signal output from the controller 70. The second driver 60 drives the motor 20 in accordance with a feedback electrification switching (FB driving), the drive signal output from the controller 70, and the lead angle signal output from the lead angle circuit 40. The controller 70 supplies the drive signal to the first driver 50 or the second driver 60, selects one of the OP driving and the FB driving, and controls a rotation of the motor 20 in accordance with the given target position or target speed. In addition, the controller 70 supplies the lead angle setting signal to the lead angle circuit 40 so as to set a phase of the lead angle circuit 40.

The motor 20 is driven by the first driver 50 in accordance with the OP driving. The "OP driving" is similar to the open-loop control of the usual stepping motor, which is a driving method that switches between the electrization to the coil 23a and the electrization to the coil 23b in the motor 20 in accordance with a preset time interval. In other words, the first driver 50 sequentially changes the electrification to the coil 23a and the electrification to the coil 23b in accordance with the input driving pulse interval (driving frequency) and the rotational direction, thereby rotating the rotor 22 at a set velocity (velocity control). In addition, the first driver 50 can rotate the rotor 22 by a set angle in accordance with the input drive pulses (position control).

The motor 20 is driven by the second driver 60 in accordance with the FB driving. The "FB driving" is similar to the feedback control, and a driving method that is configured to switch between the electrization to the coil 23a and the electrification to 23b in accordance with the output of the lead angle circuit 40. In other words, the second driver 60 sequentially switches between the electrification to the coil 23a and the electrification to the coil 23b in accordance with the number of input driving pulses, the rotational direction, and the lead angle signal output from the lead angle circuit 40. Thereby, the rotor 22 can be rotated by a set angle (position control). In addition, the rotor 22 can be rotated with a set torque by controlling the current flowing in the coil 23a or 23b (current control). The torque-the number of rotations characteristic can be controlled by controlling a lead angle in a lead angle signal output from the lead angle circuit 40 (lead angle control).

Figure 3:
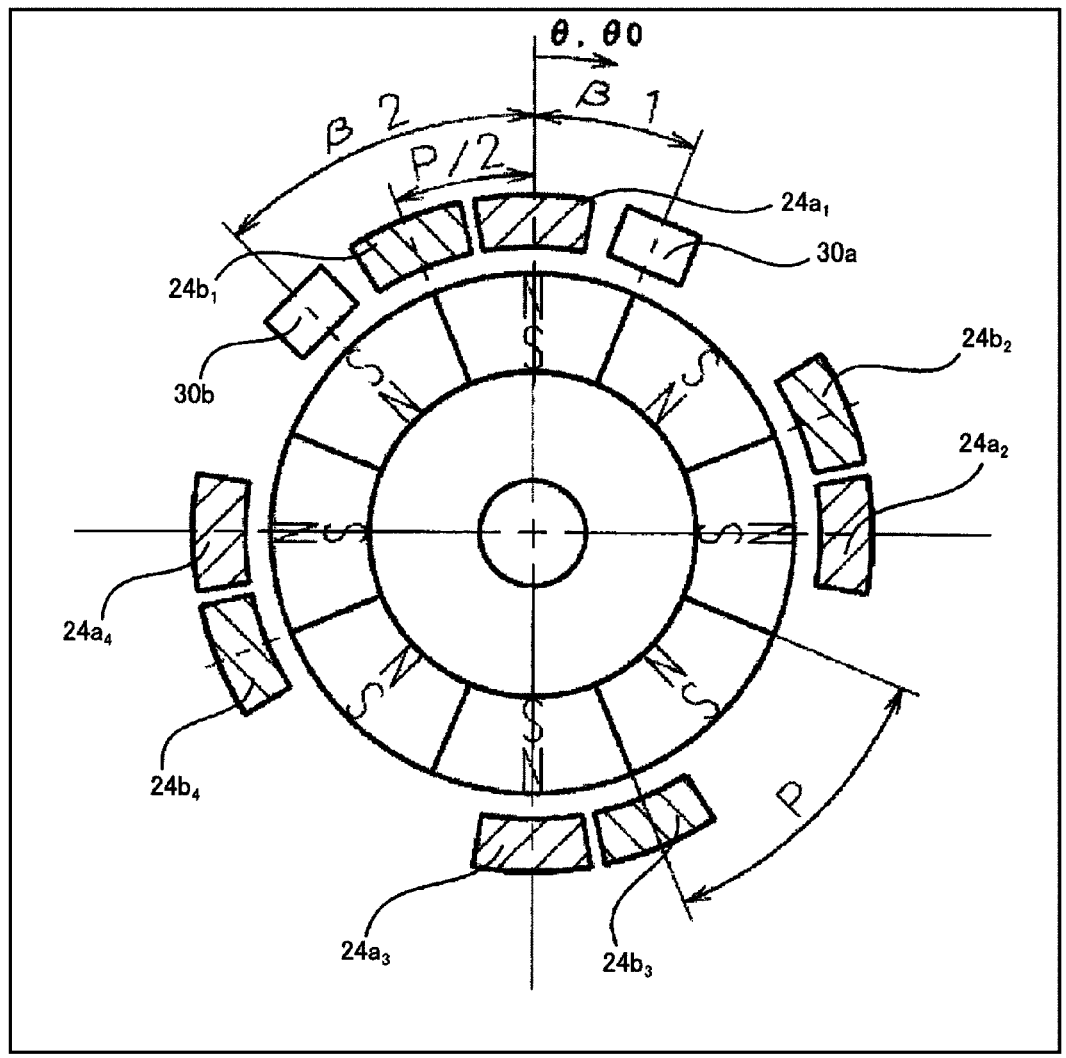
FIG. 3 is a sectional view showing a phase relationship among yokes, the position detectors, and a rotor shown in FIG. 2.

FIG. 3 is a sectional view in the axial direction showing a phase relationship among the yokes 24a and 24b, the position detectors 30a and 30b, and the rotor 22. In FIG. 3, the clockwise direction is a positive direction. $24a_1$ to $24a_4$ denote magnetic pole teeth of the yoke 24a, and $24b_1$ to $24b_4$ are magnetic pole teeth of the yoke 24b. In this embodiment, the magnet has 8 magnetic poles with a magnetization angle P of 45°. When the yoke 24a is used as a reference, the yoke 24b has a phase P/2 of −22.5°, the position detector 30a has a phase β1 of +22.5°, and the position detector 30b has a phase β2 of −45°.

A description will now be given of an operation of the FB driving by using the electric angle. The electric angle is expressed on the assumption that one period of the magnet's force is 360°, and an electric angle θ is expressed as follows where M is the pole number of the rotor 22, and $θ_o$, is an actual angle:

$$θ=θ_o×M/2 \qquad \text{EQUATION 1}$$

Each of a phase difference between the yokes 24a and 24b, a phase difference between the position detectors 30a and 30b, a phase difference between the yoke 24a and the position detector 30a is set to an electric angle of 90°. In FIG. 3, the centers of the magnetic pole teeth $24a_1$ to $24a_4$ of the yoke 24a oppose to the magnet's N pole center. Assume that this state is the rotor 22's initial state and an electric angle is 0°.

Figure 4:
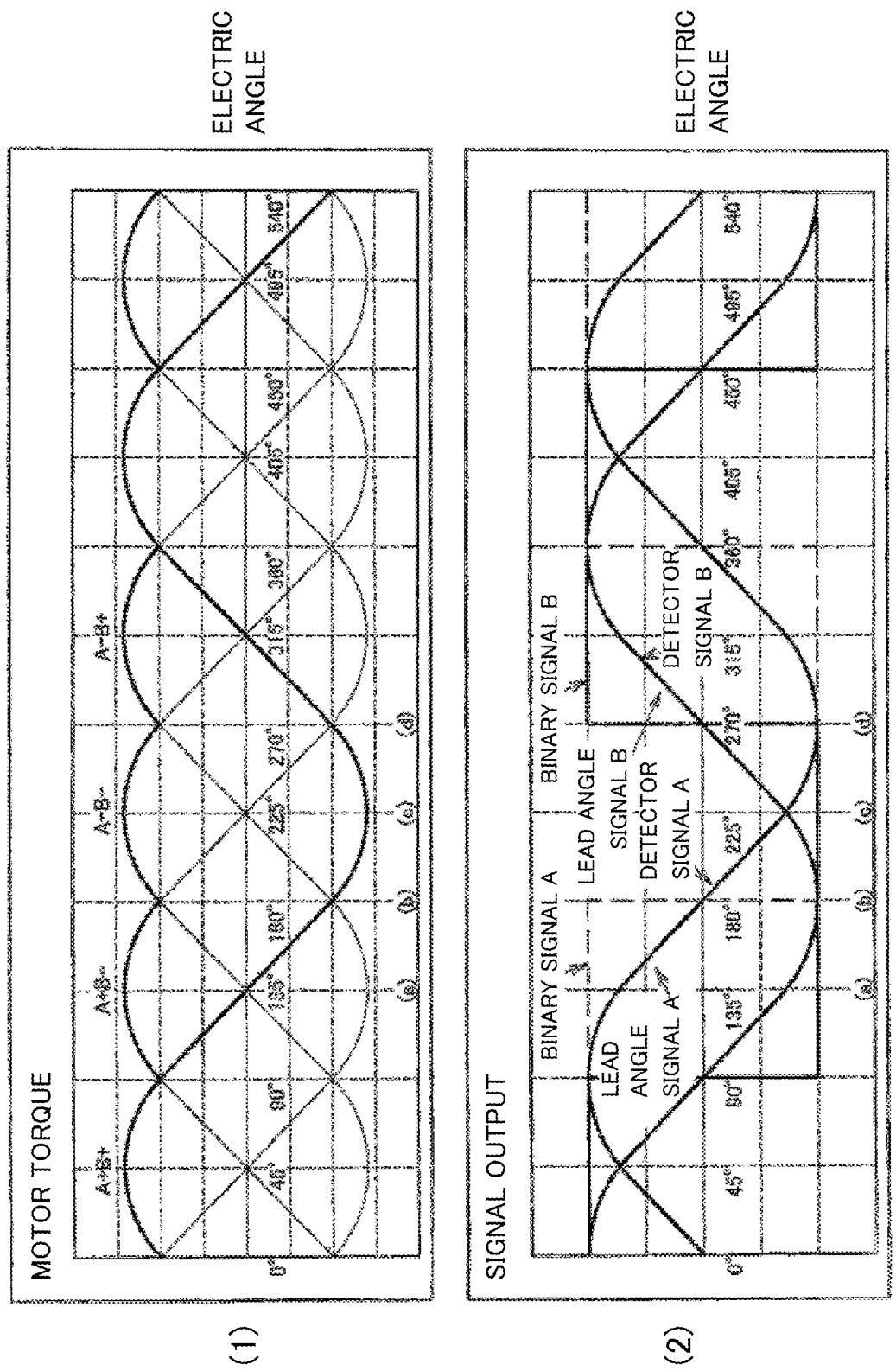
FIG. 4 is a graph showing a relationship among a rotational angle of the rotor, the motor torque, and signal outputs from the position detectors shown in FIG. 2.

FIG. 4(1) is a graph showing a relationship between the rotational angle of the rotor 22 and the motor torque, where the abscissa axis denotes an electric angle and the ordinate axis denotes a motor torque. Assume that a motor torque that rotates the rotor 22 clockwise is positive. When the current flows in the coil 23a in the positive diction, the yoke 24a is magnetized with an N pole and an electromagnetic force is generated between the yoke 24a and the magnetic pole of the magnet 21. When the current flows in the coil 23b in the positive direction, the yoke 24b is magnetized with an N pole and an electromagnetic force is generated with the yoke 24b and the magnetic pole of the magnet 21. When two electromagnetic forces are synthesized, a schematically sinusoidal torque is obtained as the rotor 22 rotates (torque curve A+B+). In other electrization states, similarly schematically sinusoidal torques are obtained (torque curves A+B−, A−B−, A−B+). In addition, the yoke 24a is arranged relative to the yoke 24b with a phase of an electric angle of 90°. Thus, four torques have phase differences corresponding to an electric angle of 90°.

FIG. 4(2) is a graph showing a relationship between the rotational angle of the rotor 22 and the signal outputs of the position sensors 30a and 30b. The abscissa axis denotes an electric angle, and the ordinate axis denotes the signal outputs of the position detectors 30a and 30b. The magnet 21 has a schematically sinusoidal magnetized pattern in the radial direction relative to the electric angle. Therefore, a schematic sine wave signal is obtained from the position detector 30a (detector signal A). In this embodiment, the position detector 30a outputs a positive value when it faces the N pole of the magnet 21. The position detector 30b is arranged with a phase of an electric angle of 90° relative to the position detector 30a, and thus a cosine wave signal is obtained from the position detector 30b (detector signal B). In this embodiment, the position detector 30*b* has an inverted polarity to the position detector 30*a*, and thus outputs a positive value when it faces the S pole of the magnet 21.

The lead angle circuit 40 operates an output of the position detector 30*a* and an output of the position detector 30*b*, generates and outputs a first lead angle signal and a second lead angle signal having arbitrary lead angles set by the controller 70. An operation method of the lead angle signal will be described below.

Each signal can be expressed below, where θ is an electric angle, HE1 is an output of the position detector 30*a*, and HE2 is an output of the position detector 30*b*:

$$HE1 = \sin\theta \quad \text{Equation 2}$$

$$HE2 = \cos\theta \quad \text{Equation 3}$$

A first lead angle signal PS1 that moves forward by a lead angle α, and a second lead angle signal PS2 that moves forward by the lead angle α can be expressed with HE1, HE2, and α:

$$PS1 = \sin(\theta+\alpha) = HE1 \times \cos\alpha + HE2 \times \sin\alpha \quad \text{Equation 4}$$

$$PS2 = \cos(\theta+\alpha) = HE2 \times \cos\alpha - HE1 \times \sin\alpha \quad \text{Equation 5}$$

In this embodiment, the lead angle circuit 40 utilizes these operational equations.

Figure 5:
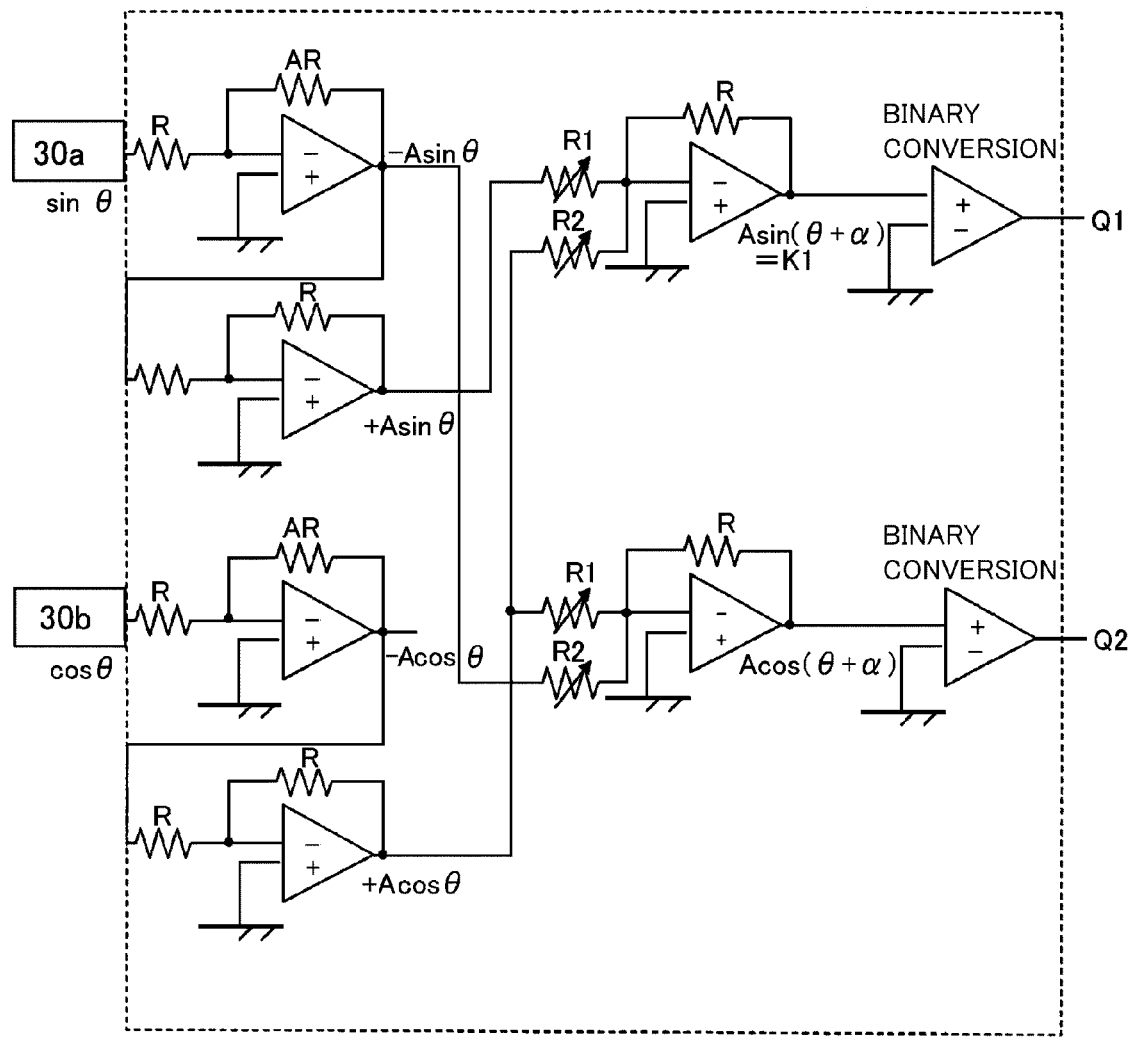
FIG. 5 is a circuit diagram of a lead angle circuit shown in FIG. 1.

FIG. 5 is a circuit diagram of the lead angle circuit 40. The lead angle circuit 40 that includes an analogue circuit shown in FIG. 5, for example, can achieve the above operations. Initially, a signal from each of the position detectors 30*a* and 30*b* amplified by an amplification factor "A," and an inverted signal of the amplified signal are prepared (Asinθ, Acosθ, −Asinθ, −Acosθ). The lead angle signals are generated by adding and multiplying resistance values R1 and R2. The first lead angle signal PS1 and second lead angle signal PS2 are expressed as follows:

$$PS1 = A \times (R/R1) \times \sin\theta + A \times (R/R2)\cos\theta \quad \text{Equation 6}$$

$$PS2 = A \times (R/R1) \times \cos\theta - A \times (R/R2)\sin\theta \quad \text{Equation 7}$$

The lead angle signal that is advanced by an arbitrary angle α can be generated by selecting variable resistances R, R1, and R2 in the circuit as follows:

$$R/R1 = \cos\alpha \quad \text{Equation 8}$$

$$R/R2 = \sin\alpha \quad \text{Equation 9}$$

Binary signals are output by converting the first lead angle signal PS1 and the second lead angle signal PS2 into binary forms using a comparator.

The above generation method of the lead angle signal is merely illustrative, and the present invention is not limited to this embodiment. A known method may be used to obtain a similar effect to the above lead angle generating method, for example, by generating a lead angle signal by using a digital circuit that provides the above operations or by using a high-resolution encoder to adjust an electrization switching pulse interval.

A description will now be given of the FB driving when a lead angle in a lead angle signal is zero which is output from the lead angle circuit 40. In FIG. 4(2), the lead angle signals A and B are signals made as a result of the above operations using the detector signals A and B to provide lead angles to them. In FIG. 4(2), the lead angle is zero, the detector signal A accords with the lead angle signal A, and the detector signal B accords with the lead angle signal B. The binary signals A and B are signals by converting the lead angle signals A and B into binary signals using a comparator.

In the FB driving, the electrification to the coil 23*a* is changed based on the binary signal A, and the electrification to the coil 23*b* is changed based on the binary signal B. In other words, when the binary signal A has a positive value, the current in the positive direction is flowed in the coil 23*a*, and when the binary signal A has a negative value, the current in the reverse direction is flowed in the coil 23*a*. When the binary signal B has a positive value, the current in the positive direction is flowed in the coil 23*b*, and when the binary signal B has a negative value, the current in the reverse direction is flowed in the coil 23*b*.

Figure 6:
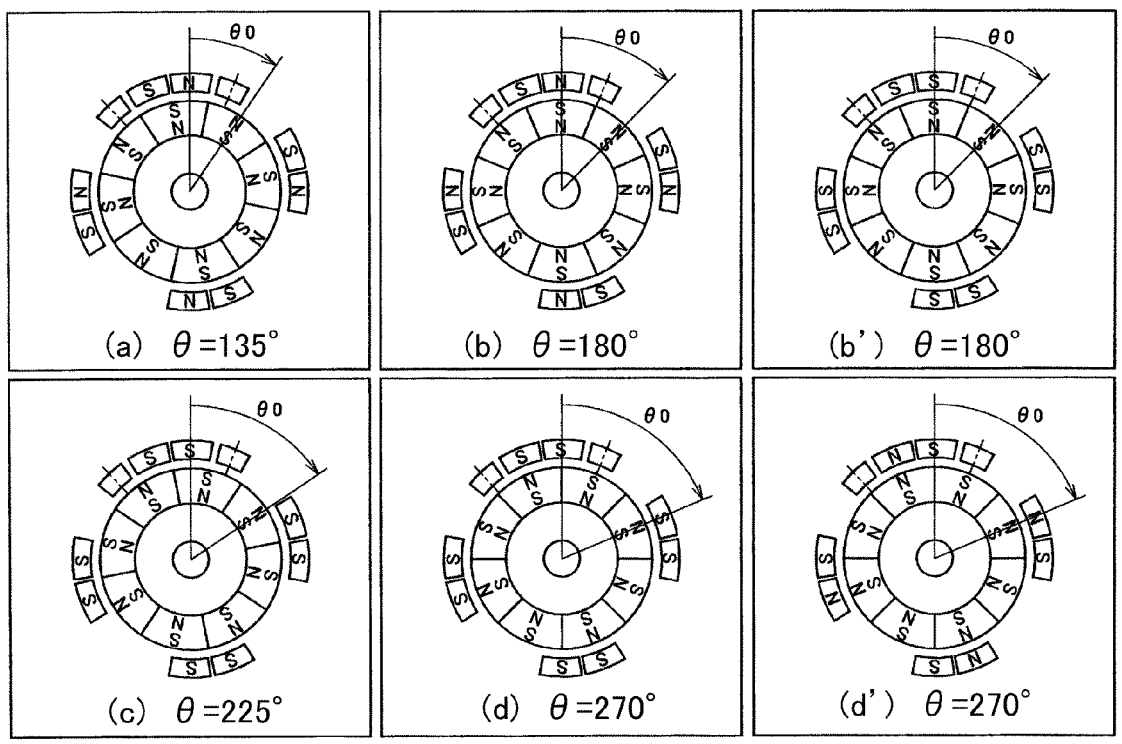
FIG. 6 is a sectional view in the axial direction of the yokes, the position detectors, and the rotor shown in FIG. 2 in the feedback electrification switching.

FIG. 6 is a sectional view in the axial direction showing an operation of the FB driving.

FIG. 6(*a*) shows a state in which the rotor 22 rotates by an electric angle of 135°. Each lead angle signal has a value shown FIG. 4(2)(*a*), where a binary signal A has a positive value and a binary signal B has a negative value. Thus, the current flows in the coil 23*a* in the positive direction, and the yoke 24*a* is magnetized with the N pole, and the current flows in the coil 23*b* in the reverse direction, and the yoke 24*b* is magnetized with the S pole. At this time, a clockwise torque corresponding to a torque curve A+B− shown in FIG. 4(1) works, and the rotor 22 rotates in response to a rotational force in the θ direction.

FIG. 6(*b*) shows the rotor 22 that has rotated by an electric angle of 180°. The position detector 30*a* is located at the boundary between the N pole and the S pole in the magnet 21. Thus, the binary signal A is switched from the positive value to the negative value at the boundary of the electric angle of 180°, and the electrization direction to the coil 23*a* is switched from the positive direction to the reverse direction. This electric angle accords with the electric angle of the node between the torque curve A+B− and the torque curve A−B−.

FIG. 6(*b'*) shows a state in which the rotor 22 rotates by an electric angle of 180° and the electrization direction to the coil 23*a* is switched. The current flows in the coil 23*a* in the reverse direction and the yoke 24*a* is magnetized with the S pole; the current flows in the coil 23*b* in the reverse direction and the yoke 24*b* is magnetized with the S pole. At this time, a clockwise torque corresponding to the torque curve A−B− in FIG. 4(1) works, and the rotor 22 rotates in response to the rotational force in the θ direction.

FIG. 6(*c*) shows a state in which the rotor 22 rotates by an electric angle of 225°. Each lead angle signal has a value shown in FIG. 4(2)(*c*), and both the binary signals A and B have negative values. Thus, the current in the negative direction flows in the coil 23*a* and the yoke 24*a* is magnetized with the S pole; the current in the reverse direction flows in the coil 23*b* and the yoke 24*b* is magnetized with the S pole. At this time, a clockwise torque works corresponding to the torque curve A−B− shown in FIG. 4(1), and the rotor 22 rotates in response to the rotational force in the θ direction.

FIG. 6(*d*) shows a state in which the rotor 22 rotates by an electric angle of 270°. The position detector 30*b* is located at the boundary between the N pole and the S pole in the magnet 21. Therefore, at the boundary of an electric angle of 270°, the binary signal B switches from a negative value to a positive value and the electrization direction of the coil 23*b* is switched from the reverse direction to the positive direction. This electric angle accords with that of the node between the torque curve A−B− and the torque curve A−B+.

FIG. 6(*d'*) shows a state in which the rotor rotates by an electric angle of 270° and the electrization direction to the coil 23*b* is switched. The current flows in the coil 23*b* in the positive direction, and the yoke 24*b* is magnetized with N pole; the current flows in the coil 23*a* in the reverse direction, and the yoke 24*a* is magnetized with the S pole. At this time, a clockwise torque works corresponding to the torque curve A−B+ shown in FIG. 4(1), and the rotor 22 rotates in response to the rotational force in the θ direction.

By repeating the above operations, the rotor 22 can be continuously rotated. A reverse rotation is also available by inverting a sign of the binary signal A or B.

Figure 7:
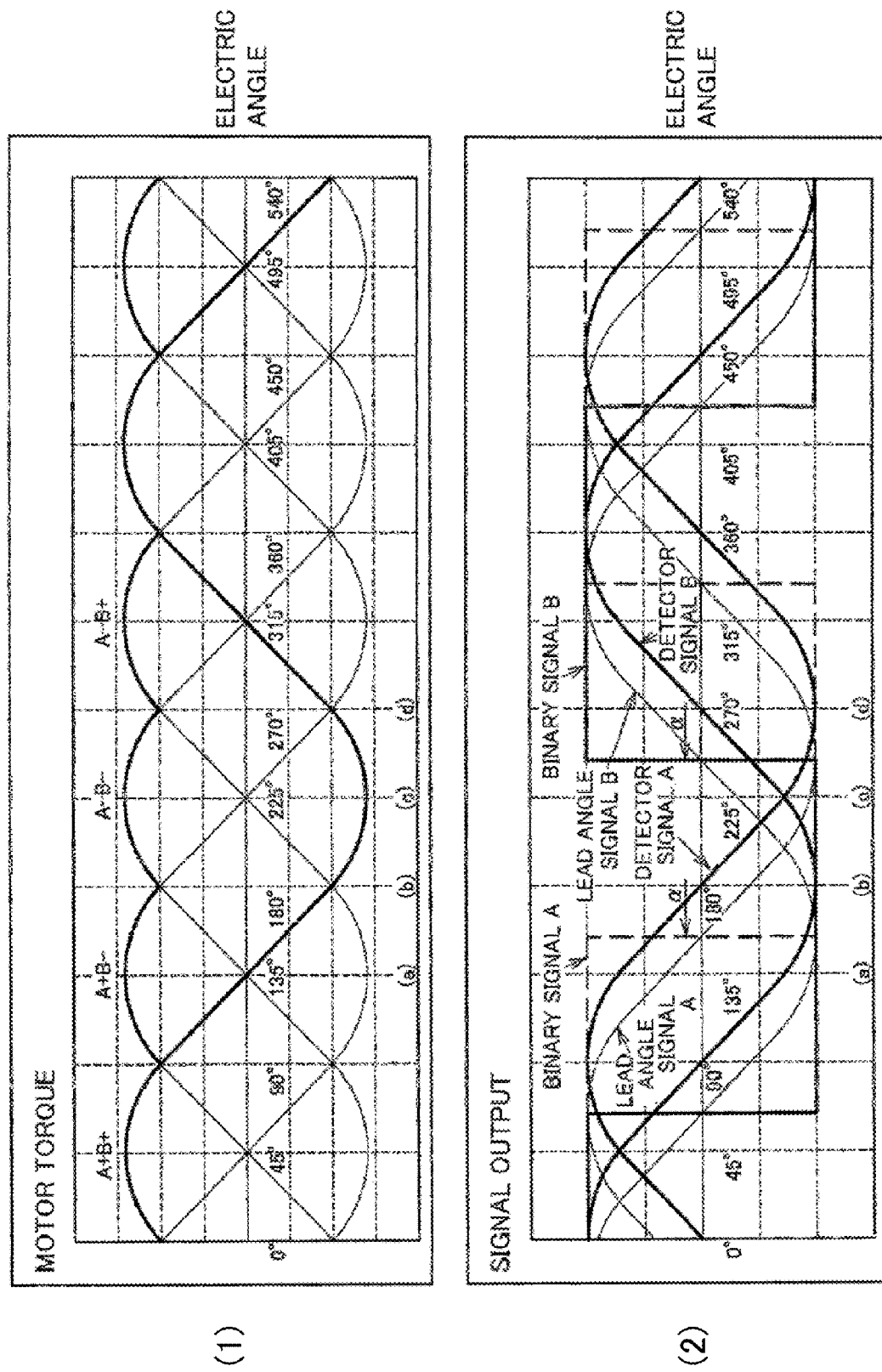
FIG. 7 is a graph showing a relationship among the rotational angle of the rotor having a lead angle α, the motor torque, and each signal output from the position sensor shown in FIG. 2 in the feedback electrification switching.

A description will now be given of the FB driving when the lead angle signal output from the lead angle circuit 40 has a lead angle α. FIG. 7(1) is a graph showing a relationship between a rotational angle (electric angle) of the rotor 22 and the motor torque when the lead angle signal output from the lead angle circuit 40 has a lead angle α. FIG. 7(2) is a graph showing a relationship between the rotational angle of the rotor 22 and each signal output, where the abscissa axis denotes an electric angle and the ordinate axis denotes each signal output. In FIG. 7(2), the lead angle A moves ahead of the detector signal A by the lead angle α, and the lead angle B moves ahead of the detector signal B by the lead angle α. In addition, the binary signals A and B generated based on the lead angle signal also move ahead of the detector signals A and B by the lead angle α. In the FB driving, the electrification to the coil 23a is switched based on the binary signal A, and the electrification to the coil 23b is switched based on the binary signal B. Therefore, the electrification switching timings of the coils 23a and 23b are faster by the lead angle α than the case having a lead angle of zero.

Figure 8:
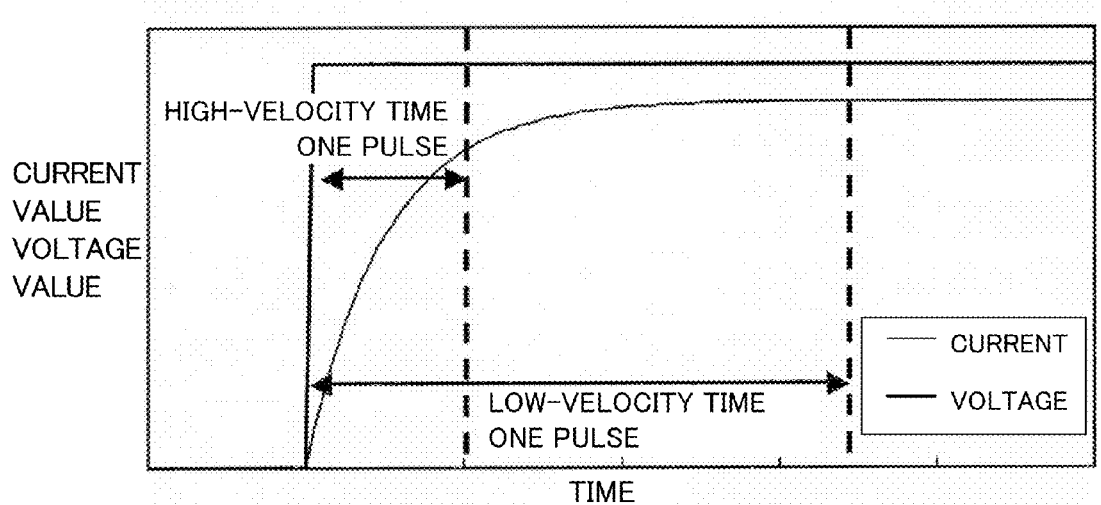
FIG. 8 is a graph showing a relationship between the electrification (excitation voltage) to the coil and the excitation current shown in FIG. 2.
Figure 9:
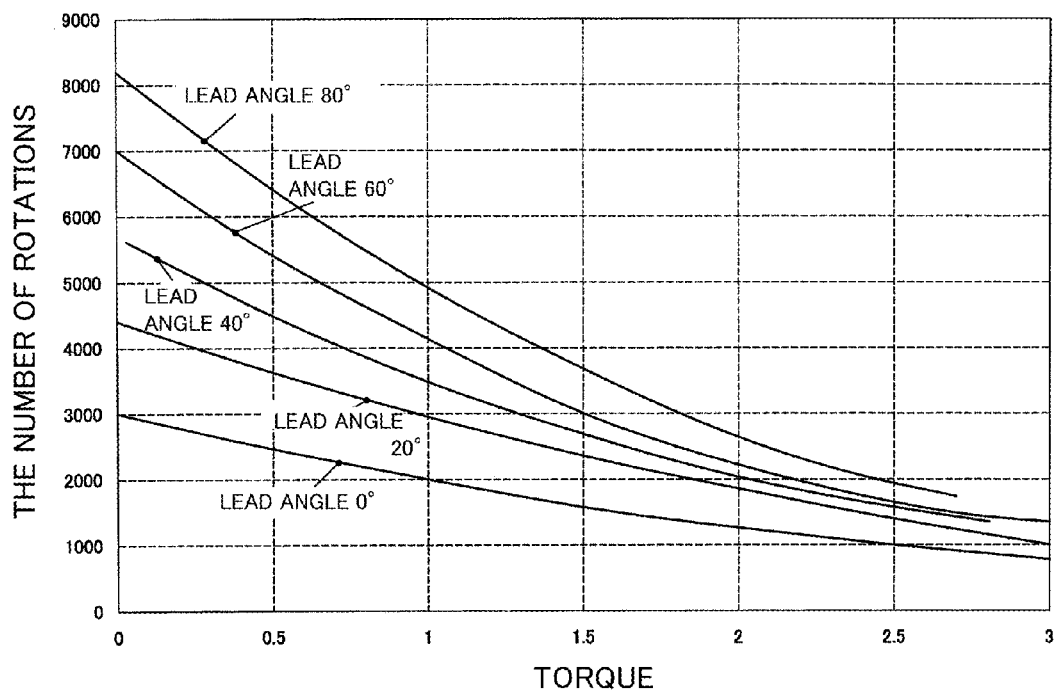
FIG. 9 is a graph showing a torque and the number of rotations when the lead angle is changed.

FIG. 8 is a graph showing a relationship between the electrifications (excitation voltages) to the coils 23a and 23b and the excitation current, where the abscissa axis denotes time and the ordinate axis denotes a voltage value or a current value. The excitation current is influenced by the inductances of the coils 23a and 23b and rises with a delay to the excitation voltage. When the number of rotations of the motor 20 is sufficiently small, this influence is insignificant and the ideal torque characteristic can be obtained. However, as the rotational velocity of the motor 22 increases, this influence becomes more significant and a phase changes before the excitation current reaches a predetermined value, causing the torque to lower. Accordingly, it is proposed to change a lead angle in accordance with a rotational velocity of the rotor 22 as the rotational velocity of the rotor increases, thereby putting forward an angle of switching the excitation to the coil 23a or 23b for early electrification to the coil 23a or 23b. FIG. 9 is a graph showing a relationship between the torque and the number of rotations when the lead angle is changed. The abscissa axis denotes the motor torque, and the ordinate axis denotes the number of rotations of the motor. It is understood from this graph that the relationship varies between the torque and the number of rotations according to the torque α. By using this characteristic, the lead angle α is changed according to the driving condition in the FB driving.

Figure 10:
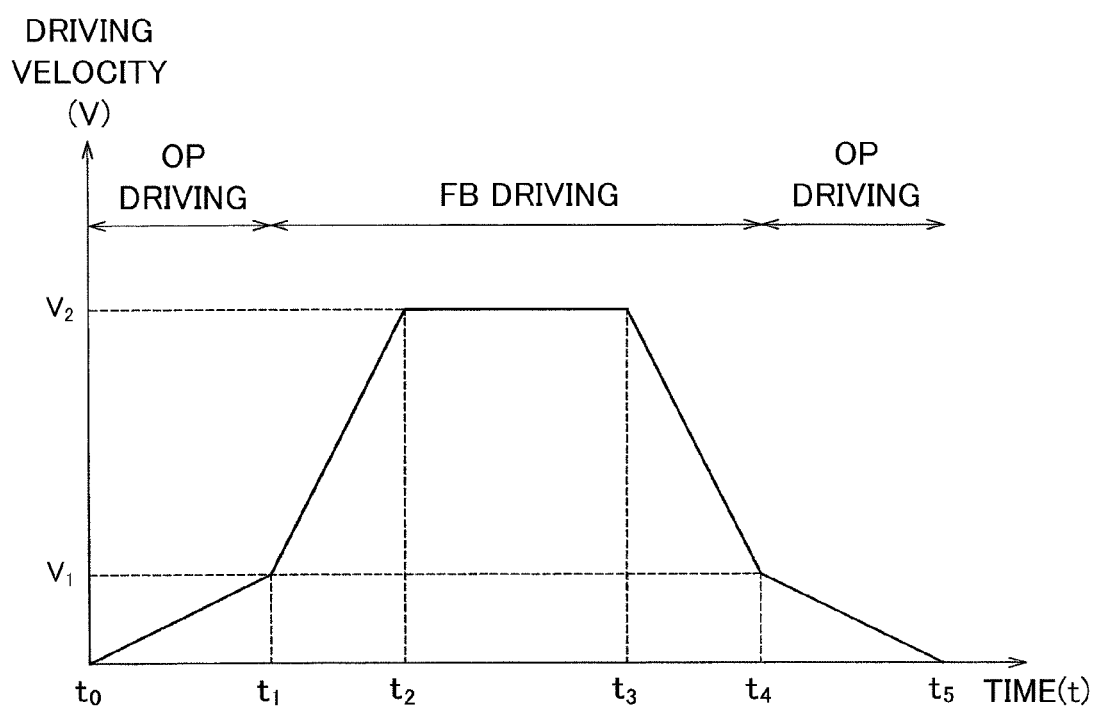
FIG. 10 is a switching sequence between the OP driving and the FB driving executed by the controller shown in FIG. 1.

This embodiment allows the controller 70 to change the driving between the OP driving and the FB driving (between the driving by the first driver 50 and the driving by the second driver 60). FIG. 10 is a graph showing a switching sequence between the OP driving and the FB driving. The abscissa axis denotes time (t), and the ordinate axis denotes a driving velocity (V). When a drive start command is output at time t0, the controller 70 outputs a drive signal to the first driver 50 to provide the OP driving and acceleration control in accordance with a predetermined acceleration. When a driving velocity reaches a driving velocity $V_1$ at time t1, the controller 70 switches the first driver 50 to the second driver 60 and outputs the drive signal so as to provide the acceleration control using the FB driving. When the driving velocity reaches a driving velocity $V_2$ at time t2, the controller 70 provides a constant speed drive control. When a stop starting command is output at time t3, the controller 70 starts a deceleration control. After the driving velocity reaches the driving velocity $V_1$ at time t4, the controller 70 switches the second driver 60 to the first driver 50, and outputs a drive signal so as to provide the deceleration control using the OP driving. The velocity reaches zero at time t5, and the rotor 22 of the motor 20 stops.

In this embodiment, the driving velocity of the OP driving can be made equal to the driving velocity $V_1$ of the FB driving in the switching so as to minimize the torque fluctuation in the switching. The driving velocity $V_1$ may be set to an arbitrary velocity as long as it is less than the step-out velocity in the OP driving, and thus the driving velocity $V_1$ can be varied according to a variety of driving condition. The driving velocity may be changed in switching the FB driving to the OP driving and in switching the OP driving to the FB driving.

FIG. 10 shows one illustrative switching sequence and may use another sequence. For example, after the FB driving is activated, the FB driving may be switched to the OB driving and then the driving may be stopped. Alternatively, a repetitively switching sequence of the FB driving, the OP driving, the FB driving, . . . , in this order may be utilized.

A driving condition of the driving method is not limited. For example, it may be switched according to a driving condition other than the driving velocity, such as a rotational amount and acceleration of the motor 20, or according to a user's command signal or a signal from another unit.

Figure 11:
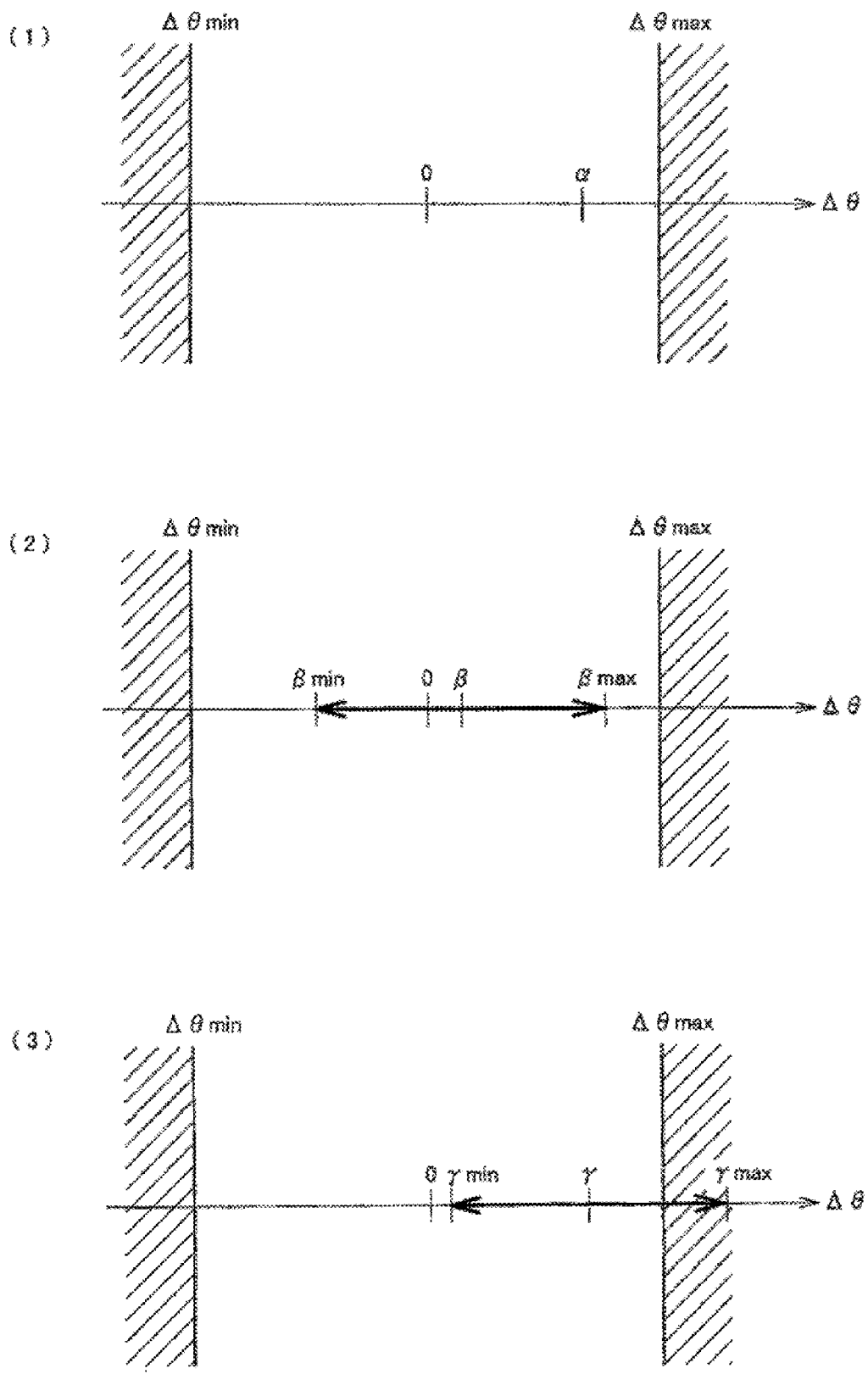
FIG. 11 is an explanatory view showing a phase difference between an electrification switching phase and of a rotation phase of a rotor.

Referring now to FIG. 11, a description will be given of a comparison between the OP driving and the FB driving regarding a generation of the step out caused by the load fluctuation. FIG. 11 is an explanatory diagram showing a difference Δθ between the electrification switching phase and the rotational phase of the rotor 22. The abscissa axis denotes an electric angle representative of the difference Δθ between the electrification switching phase and the rotational phase of the rotor 22. The point 0 corresponds to Δθ=0 or a state in which there is no difference Δθ between the electrification switching phase and the rotational phase of the rotor 22. Δθmax and Δθmin denote step-out generating boundaries, and the step out generating regions (step out region) can be expressed as follows:

$$\Delta\theta < \Delta\theta min = 180° \qquad \text{Equation 10}$$

$$\Delta\theta max = 180° < \Delta\theta \qquad \text{Equation 11}$$

In other words, when a difference between the electrification switching phase and the rotation phase of the rotor 22 becomes 2 steps or more, the rotor 22 does not stop at a target stable position and the step out occurs.

FIG. 11(1) is an explanatory view showing a phase difference between the electrification switching phase and the rotation phase of the rotor 22 in the FB driving. In FIG. 11(1), α denotes a lead angle in the FB driving. In the FB driving, the difference Δθ between the electrification switching phase and the rotational phase of the rotor 22 can be expressed as follows:

$$\Delta\theta = \alpha \qquad \text{Equation 12}$$

In the FB driving, the electrification switching is performed based on the position detection signal of the rotor 22. Thus, even when the velocity of the rotor 22 changes, the difference between the electrification switching phase and the rotation phase of the rotor 22 does not change. Δθ accords with the lead angle α, and is maintained constant.

As long as the lead angle α is controlled so as to maintain the following condition, no step out occurs:

$$\Delta\theta min < \alpha < \Delta\theta max \qquad \text{Equation 13}$$

On the other hand, the step out may occur in the OP driving at the switching time from the FB driving, unless the lead angle in the FB driving is properly set. A description will now be given of the electrification switching and the rotational position of the rotor 22 in the OP driving.

Figure 12:
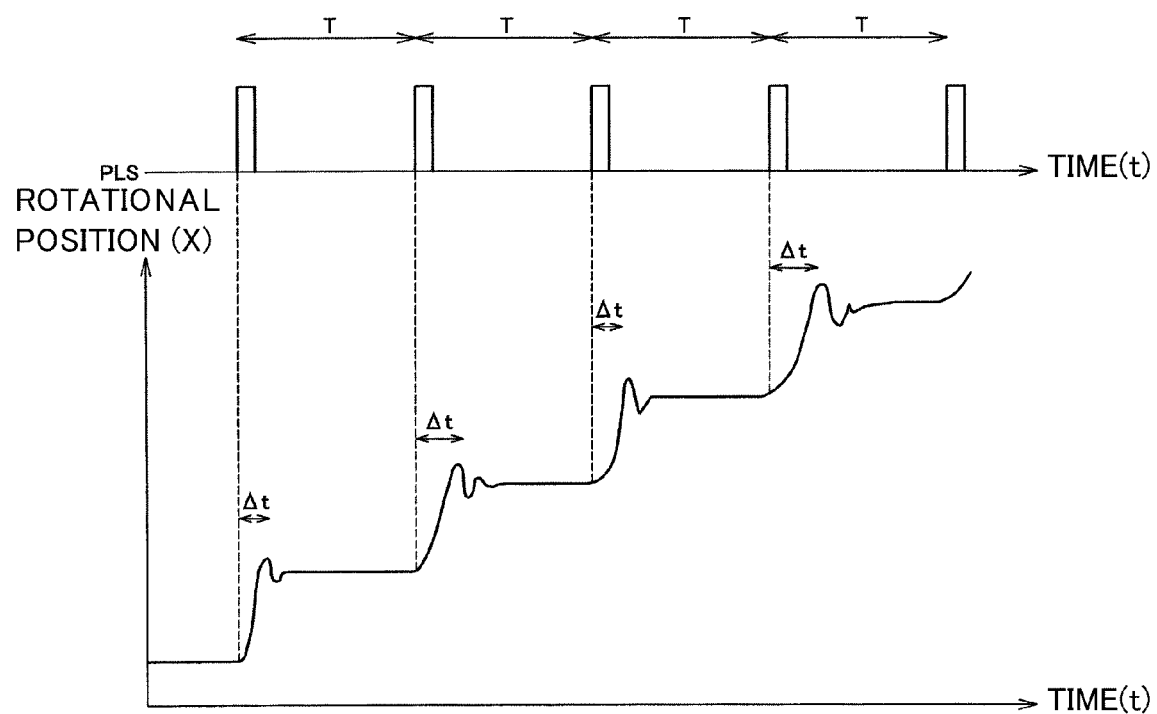
FIG. 12 is a timing chart showing an electrification switching in the OP driving and the rotation position of the rotor.

FIG. 12 is a timing chart showing the electrification switching and the rotational position of the rotor 22 in the OP driving. The abscissa axis denotes time, and the ordinate axis denotes the rotational position of the rotor 22. PLS is electrification switching timing of each of the coil 23a or 23b. T is a preset time interval (pulse interval). Δt is a response delay time of the rotor 22 to move to the predetermined rotational position after the electrification switching to the coil 23a or 23b. Δt is a value determined by the inertia of the rotor 22 and a relationship between the torque and the load of the motor 20. If it is assumed that the driving voltage and the load are constant, the relationship between the torque and the load of the motor 20 does not change and Δt has a constant value. In other words, the rotor 22 rotates with a constant delay Δt relative to the electrification switching. However, actually, the relationship between the torque and the load of the motor 20 varies due to the load fluctuation, and thus Δt always fluctuates. The difference Δθ between the electrification switching phase and the rotation phase of the rotor in the OP driving can be expressed as follows:

$$\Delta\theta = 360° \times \Delta t / T \qquad \text{Equation 14}$$

The OP driving switches the electrification for each a preset time interval (pulse interval T), and Δt is changed due to the load fluctuation, as described above. Thus, the difference Δθ fluctuates between the electrification switching phase and the rotation phase of the rotor.

FIG. 11(2) is an explanatory diagram of the difference Δθ between the electrification switching phase and the rotation phase of the rotor 22 in the continuous driving in accordance with the OP driving. In FIG. 11(2), β denotes an electric angle as a phase difference between the electrification switching phase and the rotation phase of the rotor 22. As indicated in the Equation 14, the difference between the electrification switching phase and the rotation phase of the rotor varies due to the load fluctuation, and thus β fluctuates. In FIG. 11(2), β changes from βmax to βmin. Values of βmax and βmin are determined by the structures of the motor 20, the transmission mechanism, and the control object 10. As shown in FIG. 11(2), in the continuous driving in accordance with the OP driving, β does not reach the step out region due to the fluctuation and thus the step out is less likely to occur.

Assume that the FB driving is performed with a lead angle in the FB driving which accords with β, and then switched to the OP driving. Then, both the FB driving just before switching and the OP driving just after switching maintain the difference β between the electrification switching phase and the rotation phase of the rotor 22. As long as the phase difference β is maintained, the phase difference does not reach the step out region after the FB driving is switched to the OP driving, and thus the step out is less likely to Occur.

FIG. 11(3) is an explanatory diagram showing a difference between the electrification switching phase and the rotation phase of the rotor 22 just after the FB driving is switched to the OP driving. In FIG. 11(3), γ denotes an electric angle as a difference between the electrification switching phase and the rotation phase of the rotor 22.

FIG. 11(3) shows that the FB driving is performed with the lead angle α shown in FIG. 11(1) that accords with γ, and then switched to the OP driving. Here, β in FIG. 11(2) has the following relationship with γ in FIG. 11(3):

$$\gamma > \beta \qquad \text{Equation 15}$$

As indicated in the Equation 14, the difference between the electrification switching phase and the rotation phase of the rotor 22 varies due to the load fluctuation, and thus γ fluctuates. As illustrated, γ changes from γmax to γmin. Values of γmax and γmin are determined by the structures of the motor 20, the transmission mechanism, and the control object 10. Under this condition, γ may reach the step out region beyond θmax due to the load fluctuation, and thus the step out is likely to occur. In other words, the difference between the electrification switching phase and the position of the rotor 22 in the FB driving or the lead angle is larger than that in the continuous OP driving, the step out is likely to occur in the switching.

Figure 13:
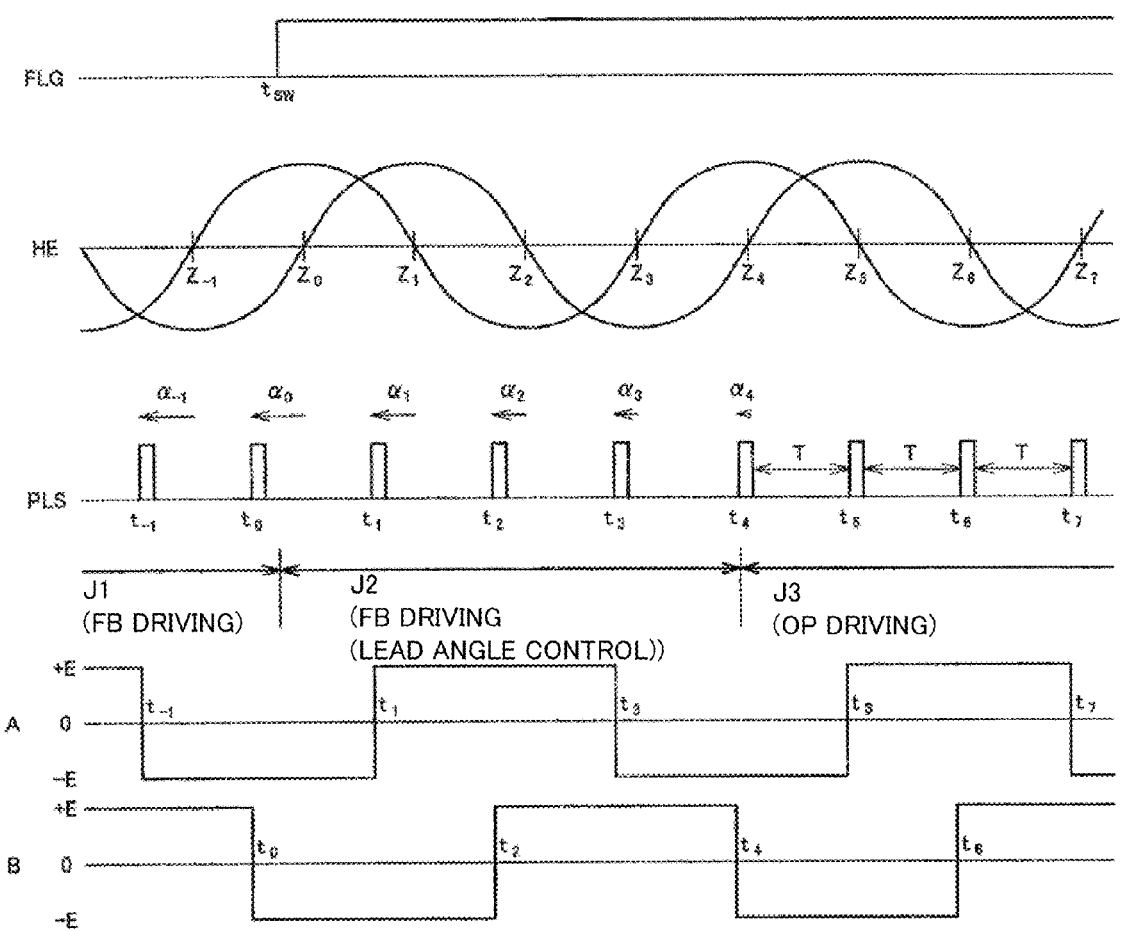
FIG. 13 is a timing chart of each signal when the FB driving is changed to the OP driving.

As described above, the controller 70 can arbitrarily set a lead angle in the lead angle circuit 40 by outputting the lead angle setting signal. FIG. 13 is a timing chart of each signal in switching from the FB driving to the OP driving, and corresponds to a state of each signal near time t4 shown in FIG. 10. In FIG. 13, FLG denotes a switching command signal from the FB driving to the OP driving. HE denotes outputs of the position sensors 30a and 30b. PLS denotes electrification switching timing. "A" denotes an applied voltage to the coil 23a, and "B" denotes an applied voltage to the coil 23b.

In the switching command signal FLG prior to time tsw, the controller 70 controls the lead angle circuit 40 through the lead angle setting signal, and the lead angle circuit 40 outputs the lead angle signal having a lead angle α0. The second driver 60 switches the electrification based on the drive signal output from the controller 70 and the lead angle signal output from the lead angle circuit 40. In other words, in a section J1 (FB driving), the electrification is switched based on the lead angle signal (not shown) that moves ahead of the outputs of the position sensors 30a and 30b by the lead angle α0, and the motor 20 is driven in accordance with the FB driving.

When the switching command signal from the FB driving to the OP driving is output at time tsw, the controller 70 prepares for switching from the FB riving to the OP driving. More specifically, the controller 70 controls the lead angle circuit 40 through the lead angle setting signal so that the lead angle can reduce in order of α0, α1, α2, α3, and α4. In other words, in a section J2 (FB driving (lead angle control)), the lead angle is changed stepwise and the motor 20 is driven in accordance with the FB driving.

When the lead angle becomes α4 at time t4, the controller 70 switches the output of the drive signal from the second driver 60 to the first driver 50. The first driver 50 switches the electrification based on the drive signal output from the controller 70. In other words, in a section J3 (OP driving), the electrification is switched based on the pulse interval T determined by the drive signal, and the motor 20 is driven in accordance with the OP driving.

As described above, unless the lead angle α in the FB driving is properly set based on the response delay of the rotor 22 (Δt in FIG. 12) in the OP driving, the step out is likely to occur in switching from the FB driving to the OP driving. Since this embodiment reduces the current lead angle α in the FB driving to set it to the target lead angle α4 and then switches the FB driving to the OP driving, the likelihood of the step out caused by the load fluctuation is diminished after the FB driving is switched to the OP driving.

When the current lead angle α0 is less than the target lead angle α4, the current lead angle α0 may be increased up to the target lead angle α4. While it is conceivable to set the lead angle to be negative in braking in the FB driving, the lead angle is increased in this case. In addition, the present invention does not restrict the number of steps in decreasing or increasing the lead angle stepwise, and may set the target lead angle α4 to zero. This is equivalent to β=0 in FIG. 11(2), and secures a maximum latitude of the phase fluctuation caused by the load fluctuation, thereby minimizing the likelihood of the step out in the phase fluctuation. The target lead angle α4 may be set based on the response delay of the rotor 22 in the OP driving. As shown in FIG. 11(2), the lead angle in the FB driving can be accorded with the difference between the position of the rotor 22 and the electrification switching phase in the continuous driving in accordance with the OP driving, and the likelihood of the step out at the switching time can be remarkably reduced. At this time, the target lead angle α4 can be expressed as follows where β1 is an electric angle as a response delay of the rotor 22 in the OP driving after switching:

$$\alpha 4 = \beta 1 \quad \text{Equation 16}$$

β1 may be obtained by previously measured the response delay in the switching velocity (driving velocity V1 in FIG. 10) or by using a calculation value. A difference between the rotation phase of the rotor 22 and the electrification switching phase after switching to the OP driving depends upon the driving velocity (pulse interval) as indicated in the Equation 14. By determining the target lead angle α4 based on the driving velocity at the switching time, the lead angle in the FB driving can be accorded with the difference between the electrification switching phase and the position of the rotor in the continuous driving in accordance with the OP driving, irrespective of the driving velocity at the switching time. Therefore, the likelihood of the step out at the switching time can be remarkably reduced.

At this time, the target lead angle α4 can be expressed as follows by using the pulse terminal T in the OP driving after switching:

$$\alpha 4 = 360° \times \Delta t / T \quad \text{Equation 17}$$

Figure 14:
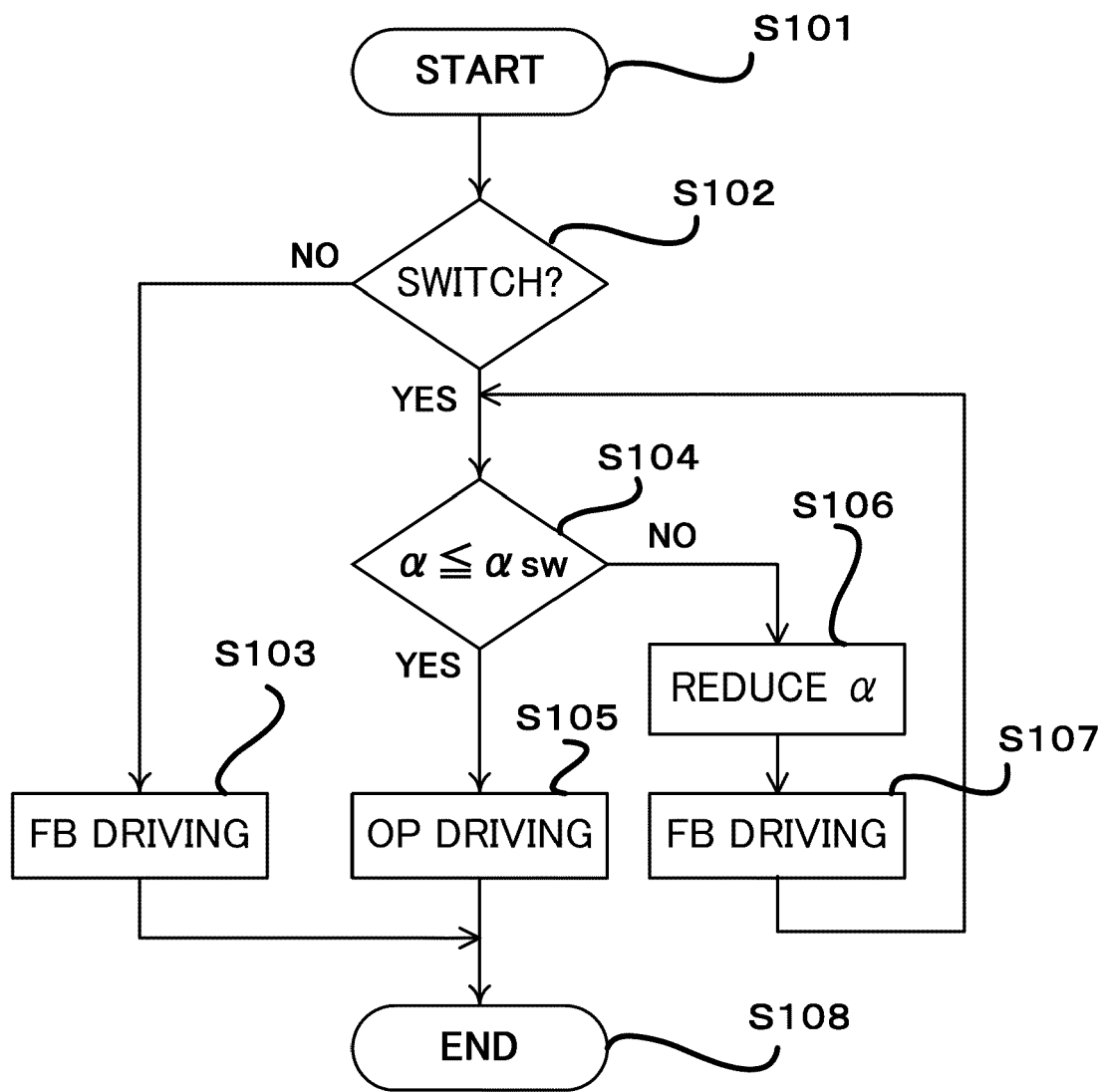
FIG. 14 is a flowchart showing an operation of the controller when the FB driving is changed to the OP driving.

FIG. 14 is a flowchart showing an operation of the controller 70 in switching from the FB driving to the OP driving.

When a switching standby state to the OP driving starts during the FB driving (S101), the controller 70 determines whether the switching signal from the FB driving to the OP driving is output (S102). When the switching signal has not yet been output, switching to the OP driving is not provided. The controller 70 outputs the drive signal to the second driver 60 so as to drive the motor 20 in accordance with the FB driving (S103), and terminates the switching standby state.

When the switching signal is output in S102, the controller 70 compares the lead angle α in the FB driving with the predetermined lead angle αsw (S104). When α is equal to or less than αsw, switching to the OP driving is provided. The controller 70 outputs the drive signal to the first driver 50 so as to drive the motor 20 in accordance with the OP driving (S105), and terminates the switching standby state.

When α is larger than αsw in S104, the controller 70 outputs the lead angle setting signal in accordance with a previously stored lead angle reduction table, and decreases the lead angle α of the lead angle circuit 40 by one step (S106). Thereafter, the controller 70 outputs the driving signal to the second driver 60, and the second driver 60 switches the electrification in accordance with the lead angle signal having the decreased lead angle α so as to drive the motor 20 in accordance with the FB driving (S107). Thereafter, the controller 70 again compares the lead angle α with the predetermined lead angle αsw (S104).

The controller 70 of this embodiment switches the FB driving to the OP driving in accordance with the above flowchart, decreases the lead angle stepwise down to the predetermined lead angle, and then switches the FB driving to the OP driving.

Thus, the motor driver of this embodiment changes the lead angle in the FB driving so that the lead angle can be close to the predetermined value, prior to switching from the FB driving to the OP driving, and thereafter switches the driving. Thereby, the motor driver reduces the likelihood of the step out in the switching of the driving, and improves the stability of the driving. The predetermined value of zero can minimize the likelihood of the step out caused by the load fluctuation in switching of the driving. When the predetermined value is the response delay of the rotor 22 in the OP driving, the step out caused by the load fluctuation can be remarkably reduced in switching of the driving. When the predetermined value is a value corresponding to the driving velocity at the switching time, the step out caused by the load fluctuation can be remarkably reduced in switching of the driving.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-270364, filed Oct. 20, 2008, which is hereby incorporated by reference herein in its entirety.

What is claimed is:

1. A drive apparatus comprising:
   a magnet rotor having a plurality of magnetic poles that are magnetized;
   a stator including a magnetic pole portion that opposes each pole of the magnet rotor, and a coil configured to excite the magnetic pole portion;
   a position detector configured to detect a position of the magnet rotor;
   a lead angle circuit configured to output a signal having a lead angle relative to an output of the position detector;
   a first driver configured to switch an electrification state of the coil in accordance with a preset time interval;
   a second driver configured to switch the electrification state of the coil in accordance with an output of the lead angle circuit; and
   a controller configured to change driving by the second driver to driving by the first driver,
   wherein prior to changing the driving by the second driver to the driving by the first driver, the controller adjusts a lead angle amount of the signal output from the lead angle circuit within a range that does not cause step out in the driving by the first driver.

2. The drive apparatus according to claim 1, wherein prior to changing the driving by the second driver to the driving by the first driver, the controller adjusts the lead angle amount so as to make a driving velocity in the driving by the second driver equal to that in the driving by the first driver.

3. The drive apparatus according to claim 1, wherein prior to changing the driving by the second driver to the driving by the first driver, the controller adjusts the lead angle amount so as to make the lead angle amount equal to a lead angle amount set based on a response delay of the magnet rotor in the driving by the first driver.

4. The drive apparatus according to claim 3, wherein the controller adjusts the lead angle amount to 360°×Δt/T where Δt is a response delay of the magnet rotor in the driving by the first driver, and T is a time interval used to switch an electrification state of the coil in the driving by the first driver.

5. The drive apparatus according to claim 1, wherein the controller adjusts the lead angle amount to zero prior to changing the driving by the second driver to the driving by the first driver.

* * * * *